US012566119B2

(12) United States Patent
Pokki-Riikonen

(10) Patent No.: US 12,566,119 B2
(45) Date of Patent: Mar. 3, 2026

(54) MICROSCOPE COMPRISING A MAGNETIC MICROMANIPULATOR

(71) Applicant: Aalto University Foundation sr, Aalto (FI)

(72) Inventor: Juho Pokki-Riikonen, Espoo (FI)

(73) Assignee: Aalto University Foundation sr, Aalto (FI)

( * ) Notice: Subject to any disclaimer, the term of this patent is extended or adjusted under 35 U.S.C. 154(b) by 197 days.

(21) Appl. No.: 18/267,782

(22) PCT Filed: Jan. 4, 2022

(86) PCT No.: PCT/FI2022/050007
§ 371 (c)(1),
(2) Date: Jun. 16, 2023

(87) PCT Pub. No.: WO2022/148907
PCT Pub. Date: Jul. 14, 2022

(65) Prior Publication Data
US 2024/0102906 A1 Mar. 28, 2024

(30) Foreign Application Priority Data
Jan. 7, 2021 (FI) ..................................... 20217003

(51) Int. Cl.
*G01N 11/10* (2006.01)
*G01B 3/08* (2006.01)
(Continued)

(52) U.S. Cl.
CPC ............... *G01N 11/10* (2013.01); *G01N 3/08* (2013.01); *G01N 2011/0086* (2013.01);
(Continued)

(58) Field of Classification Search
CPC .. G01N 11/10; G01N 3/08; G01N 2011/0086; G01N 2203/005;
(Continued)

(56) References Cited

U.S. PATENT DOCUMENTS

2004/0021073 A1 2/2004 Barbic et al.
2004/0244470 A1 12/2004 Vicci et al.
(Continued)

FOREIGN PATENT DOCUMENTS

DE 19745807 A1 5/1999
WO WO2010076337 A1 7/2010
WO WO2013106480 A1 7/2013

OTHER PUBLICATIONS

Keller et al: Oscillatory magnetic bead rheometer for complex fluid microrheometry. Review of Scientific Instruments, Sep. 2001, vol. 72, No. 9, pp. 3632-3634.
(Continued)

*Primary Examiner* — Brandi N Hopkins
(74) *Attorney, Agent, or Firm* — Laine IP Oy

(57) ABSTRACT

There is provided a microscope comprising a micromanipulator, comprising a first electromagnet comprising a first magnetic core; a second electromagnet comprising a second magnetic core, wherein the first magnetic core and the second magnetic core are configured to generate a magnetic force on magnetic probes arranged within a biological matrix arranged in between the first magnetic core and the second magnetic core; and wherein the microscope comprises imaging means configured to capture images of the biological matrix comprising the magnetic probes for detection of displacements of the magnetic probes caused by the magnetic force.

17 Claims, 7 Drawing Sheets

(51) Int. Cl.
    *G01N 3/08*         (2006.01)
    *G01N 11/00*      (2006.01)

(52) U.S. Cl.
    CPC .................. *G01N 2203/005* (2013.01); *G01N 2203/0089* (2013.01); *G01N 2203/0094* (2013.01); *G01N 2203/0647* (2013.01)

(58) Field of Classification Search
    CPC ... G01N 2203/0089; G01N 2203/0094; G01N 2203/0647; G01N 33/487; G01N 33/50; G01N 11/14
    USPC ....................................................... 73/54.02
    See application file for complete search history.

(56)                References Cited

U.S. PATENT DOCUMENTS

2006/0263890 A1   11/2006  Decoster et al.
2014/0047903 A1    2/2014  Sakai

OTHER PUBLICATIONS

Waigh: Advances in the microrheology of complex fluids. REP PROG PHYS, 2016, vol. 79, No. 7, 074601, 62 pages.

MICROSCOPE COMPRISING A MAGNETIC MICROMANIPULATOR

FIELD

Various example embodiments relate to a microrheometer using a magnetic micromanipulator integrated to a microscope.

BACKGROUND

A variety of biological processes including cancer progression are impacted by differences in extracellular matrix stiffness. Not only matrix stiffness but also viscoelasticity has a distinct impact on cell behaviors. Further, cells are capable of remodeling the surrounding matrices by changing the matrix mechanics, and cells can respond to the changes.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided a microscope comprising a micromanipulator, comprising a first electromagnet comprising a first magnetic core; a second electromagnet comprising a second magnetic core, wherein the first magnetic core and the second magnetic core are configured to generate a magnetic force on magnetic probes arranged within a biological matrix arranged in between the first magnetic core and the second magnetic core; and wherein the microscope comprises or is connected to imaging means configured to capture images of the biological matrix comprising the magnetic probes for detection of displacements of the magnetic probes caused by the magnetic force.

According to an embodiment, the microscope of claim 1, comprising a processing unit configured to: process the images to detect displacements of the magnetic probes caused by the magnetic force; and determine viscoelasticity of the biological matrix based on the detected displacements of the magnetic probes; or a transmitter configured to transmit the captured images of the magnetic probes to a processing unit for processing the images to detect displacements of the magnetic probes caused by the magnetic force and for determination of viscoelasticity of the biological matrix based on the detected displacements of the magnetic probes.

According to an embodiment, the generated magnetic force is sinusoidal force.

According to an embodiment, a diameter of the first magnetic core and the second magnetic core is 2.8-3.2 mm.

According to an embodiment, a distance between the first magnetic core and the second magnetic core is 3.3-3.7 mm.

According to an embodiment, a diameter of the first magnetic core and the second magnetic core is 5.0-10.0 mm.

According to an embodiment, a distance between the first magnetic core and the second magnetic core is 7.0-14.0 mm.

According to an embodiment, the magnetic probes are cell-size-scale.

According to an embodiment, a diameter of the magnetic probes is 10 μm.

According to an embodiment, a diameter of the magnetic probes is 100 μm.

According to an embodiment, the processing unit is configured to: process the images to detect displacements of non-magnetic probes arranged within the biological matrix; and subtract the detected displacements of the non-magnetic probes from the detected displacements of the magnetic probes.

According to an embodiment, the magnetic probes are arranged within the biological matrix which is a 3D cell culture.

According to an embodiment, a magnetic field gradient causing the magnetic force is uniform at least when a radial or axial distance from a centerline of the first electromagnet and the second electromagnet is below a threshold.

According to an embodiment, a magnetic field strength of the magnetic field gradient causing the magnetic force is below 10 mT.

According to an embodiment, a tip of the first magnetic core and a tip of the second magnetic core are flat.

According to an embodiment, the first magnetic core and the second magnetic core are cobalt-iron cores or other high-relative-permeability material.

DETAILED DESCRIPTION

Figure 1:
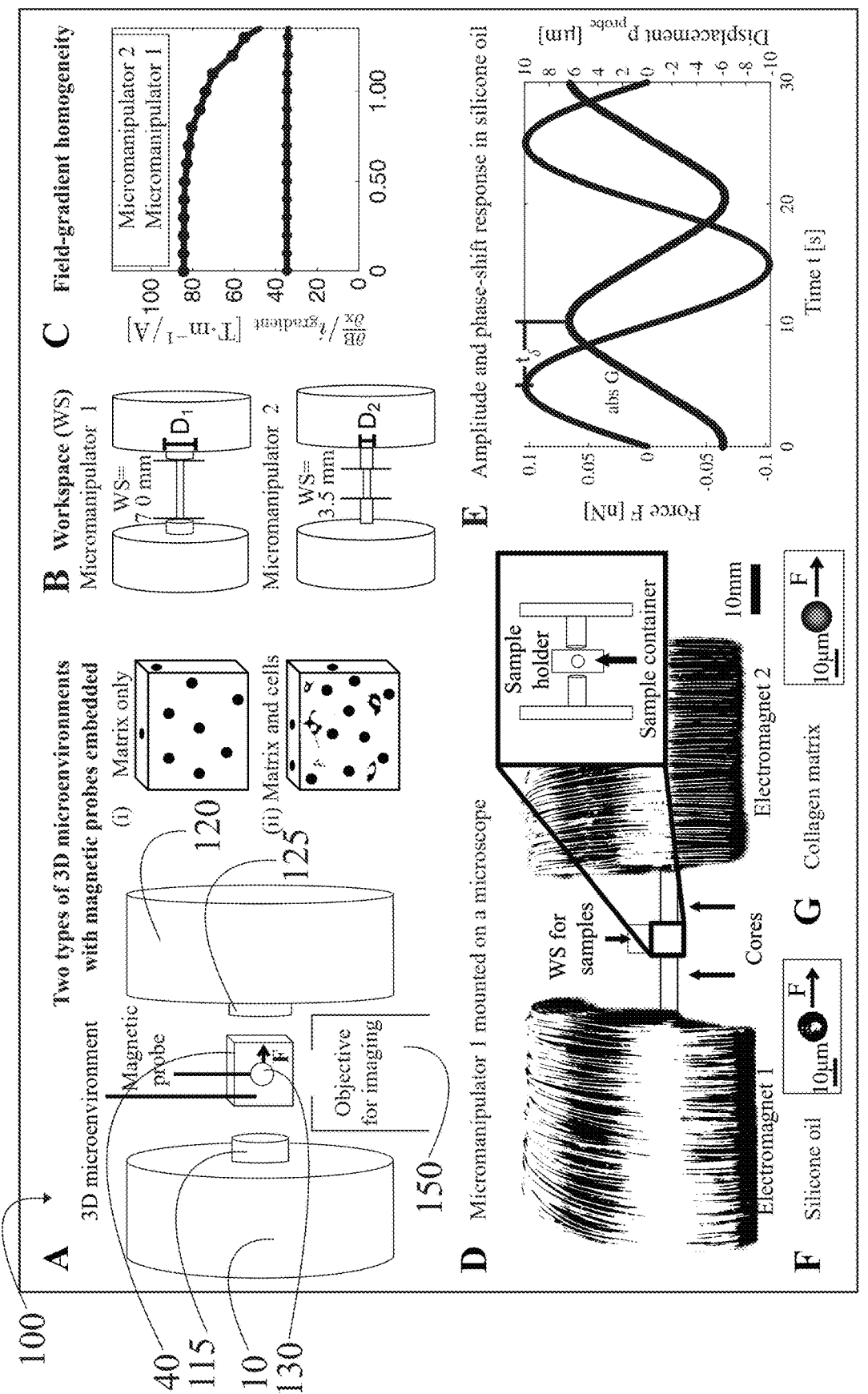
FIG. 1A shows, by way of example, a micromanipulator.
FIG. 1B shows, by way of example, micromanipulator workspace.
FIG. 1C shows, by way of example, magnetic field gradient uniformity.
FIG. 1D shows, by way of example, micromanipulator mounted on a microscope.
FIG. 1E shows, by way of example, amplitude and phase-shift response in silicone oil.
FIG. 1F shows, by way of example, silicone oil used to calibrate for the forces exerted on the microprobes.
FIG. 1G shows, by way of example, collagen matrix used to calibrate for the forces exerted on the microprobes.

The mechanical properties of the cell microenvironment relate to a variety of diseases. Mechanical interactions between extracellular matrix and cells affect malignancy in cancer. Since the extra-cellular matrix is typically heterogeneous at the microscale, not only structurally but also mechanically, varying microscale mechanical cues affecting the cells are considered. Quantifying solid-tumor-relevant properties, such as the ones during developing breast cancer, necessitates for the capability of measuring elasticity up to Young's modulus (E) levels of E≥0.5 kPa. Breast tissue ranges from ≅100 Pa in normal tissue to ≅1-10 kPa in malignant breast-cancer tissue. Current studies on the impact of matrix mechanics to cells in the context of cancer progression mainly focus on static elasticity levels without considering the matrix's time-dependent viscoelasticity (i.e. solid-like elastic and liquid-like viscous properties). However, magnetic resonance elastography measurements have demonstrated that breast cancer progression is associated not only with changes in stiffness or elasticity, but also with alterations in loss modulus, a property related to viscous energy dissipation. Recent studies have shown that changes in viscoelasticity have effects on various biological processes including cancer cell migration, cancer cell proliferation, and stem cell differentiation. Thus, measuring both stiffness and viscoelasticity, which are sensed by cells, is critical, because those properties may have effects on cancer cell phenotypes.

Sensing mechanics of extracellular matrix is a complex process, since cells can remodel the matrix. For example, fibroblast cells can contract collagen matrices, which experience stiffening at the macroscale. Such dynamic cell-matrix interactions related to cancer progression, as well as other processes, are yet to be elucidated.

Three-dimensional (3D) cell cultures are used to model a variety of biological processes in vitro because cells behave differently in 3D and 2D matrices. Atomic force microscopy (AFM) and optical tweezing quantify stiffness levels of E≥0.5 kPa but measure at a surface or proximal to the surface. Particle-tracking-based passive microrheology is typically limited to materials with E<10 Pa.

Magnetic probe-based microrheometry may be used to probe mechanics inside materials. Larger sub-millimeter-size probes can exert forces that can quantify stiffness levels of E≥0.5 kPa. To measure viscoelasticity at the stiffness level of E=0.5 kPa inside 3D cell cultures using microprobes for cell-size-scale spatial resolution, smaller microprobes with a diameter of ≅10 μm may be used.

There is provided a microrheometer using micromanipulators integrated to a biological microscope for measuring viscoelastic properties of stiffer 3D cell-culture matrices using cell-size-scale, 10-μm-diameter microprobes. The apparatus as disclosed herein, comprising the biological microscope and the micromanipulator, is capable of measuring viscoelasticity in 3D cell cultures having stiffness which is characteristic to cancer tissue.

Cell-size-scale viscoelasticity in 3D microenvironments is quantified using micromanipulators and 10-μm-diameter microprobes.

FIG. 1A shows, by way of example, a micromanipulator. Micromanipulator magnetically exerts forces F on magnetic microprobes within microenvironments of (i) matrix only, and (ii) 3D-matrix-based cell culture. Microprobes' displacements, detected using microscopy imaging objectives, are used to extract microscale viscoelasticity.

A microscope 100 comprises a micromanipulator. The micromanipulator comprises a first electromagnet 110 comprising a first magnetic core 115, and a second electromagnet 120 comprising a second magnetic core 125. The first magnetic core 115 and the second magnetic core 125 are configured to generate a magnetic force F on magnetic probes 130 arranged within a biological matrix 140, or a 3D microenvironment or a cell culture. The biological matrix 140 is arranged in between the first magnetic core 115 and the second magnetic core 125. The microscope 100 comprises imaging means 150, e.g. a camera and objective for imaging, configured to capture images of the magnetic probes for detection of displacements of the magnetic probes caused by the magnetic force F.

The electromagnets and the sample workspace were originally designed to measure a range of Young's moduli from 0.01 Pa to 500 Pa via sufficient magnetic-field gradients as well as via tracking of 10-μm-diameter microprobes with nanometer resolution, with the aim of quantifying cell-matrix interactions. The use of larger microprobes, such as 100 μm in diameter, enables to measure Young's moduli up to 10 kPa. The measurement system has been tested by measuring microscale viscoelastic properties of collagen matrices during fibroblast-collagen contraction. These results establish the abilities of the developed local magnetic-microrheometry system for viscoelasticity measurements in biological 3D matrices.

Magnetic microrheometers can use one or more electromagnets to apply magnetic-field gradients that apply forces on probes, and viscoelasticity is extracted based on the probes' displacements. Although one electromagnet with a sub-millimeter tip can exert forces on cell-size-scale probes that are sufficient for measuring the stiffness levels of E=0.5 kPa and higher, the exerted forces vary non-linearly with probe-electromagnet-tip distance. Further, the forces are unidirectional, which hinders measurements of dynamic viscoelasticity. The use of more than one electromagnet is required due to two reasons. First, two or more electromagnets that are configured in the appropriate geometry can generate a uniform magnetic field gradient, and thus forces, over a large region. This facilitates precise measurements of spatially varying viscoelasticity over that region. Second, two or more electromagnets are needed for two-directional force application on the probes, which enables for sinusoidal oscillations of the probes that is required for viscoelasticity measurements. Magnetic microrheometer systems that have these two critical properties, earlier used electromagnet tips, in order to provide forces that enable for the measurements of the stiffness levels of E≥0.5 kPa. However, these tips decrease the sample workspace to the sub-millimeter level that hinders the applicability of such systems to 3D cell culturing, since the sizes of 3D cultures are typically from millimeters to centimeters. Here, we developed micromanipulators based on two tipless electromagnets for 3D-matrix-based cell cultures, which are capable of measuring stiffness levels up to E=0.5 kPa using 10-μm-diameter microprobes (see FIG. 1A). Previously, analogous configurations have been limited by low magnetic-field gradients (eg. 3.0 T/m at a 1 A current), and thus, insufficient forces. Here, the micromanipulators were designed to maximize the gradients and provide sufficient forces for the measurements.

Forces F Exerted on Microprobes

The micromanipulators quantify viscoelasticity within 3D microenvironments of (i) matrices consisting of pure collagen for the baseline, and (ii) collagen matrices with fibroblast cells as an example (see FIG. 1A). The micromanipulators steer microprobes in 1D using spatially controlled magnetic fields B [T]. These fields are generated in a cylindrical symmetric configuration: $B=[B_x \ B_r \ B_\theta]^T$; where x [mm] is the axial (on-axis) coordinate between the electromagnets, along the electromagnets' centerline; r [mm] is the radial (off-axis) coordinate, perpendicular to the electromagnets' centerline; and θ [rad] is the rotation angle of r around x axis. The electromagnets' cobalt-iron cores concentrate the spatially controlled fields B on each microprobe, located at a coordinate p=[x r θ] (see FIG. 1B-D and FIG. 2 and FIG. 3).

FIG. 1B shows, by way of example, micromanipulator workspace, which is constrained by the separation of electromagnet cores, with diameters: $D_1=6.0$ mm, or $D_2=3.0$ mm.

Figure 2:
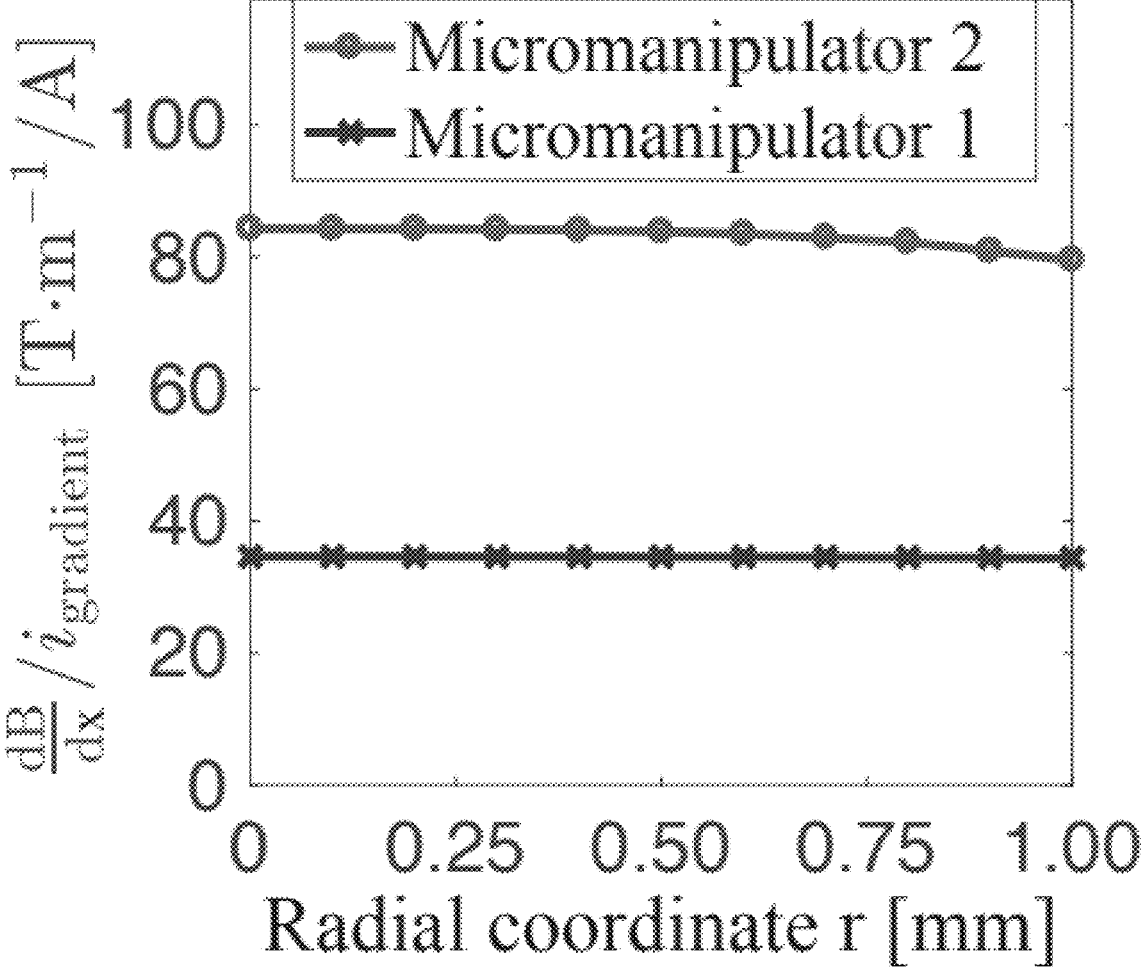
FIG. 2 shows, by way of example, magnetic field gradient uniformity in radial direction.
Figure 3:
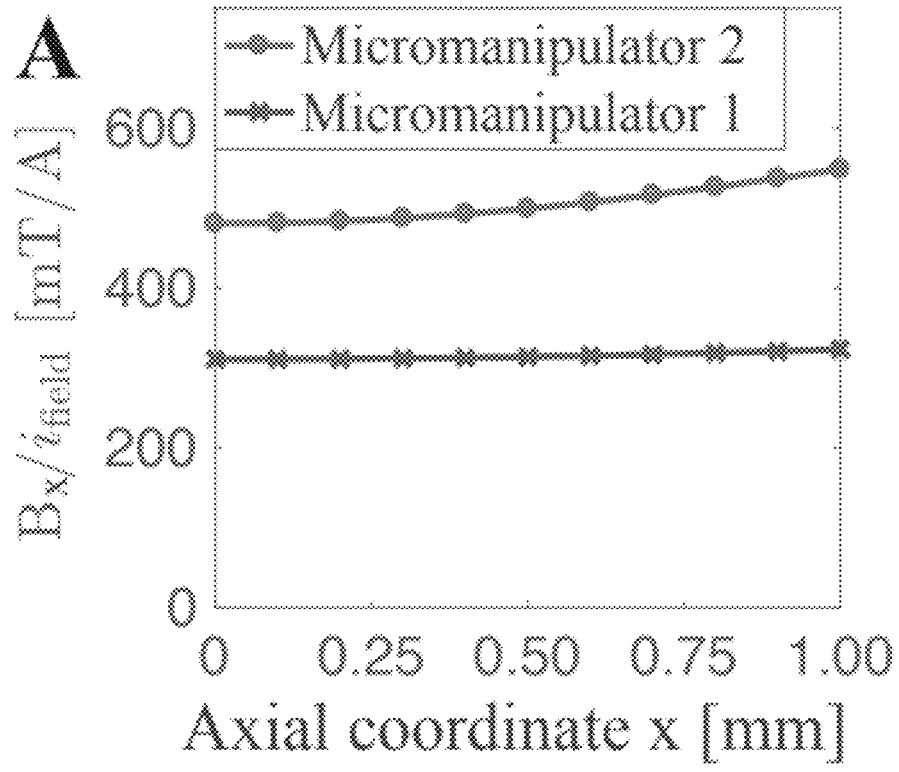
FIG. 3 shows, by way of example, magnetic field uniformity in axial and radial directions.
Figure 3:
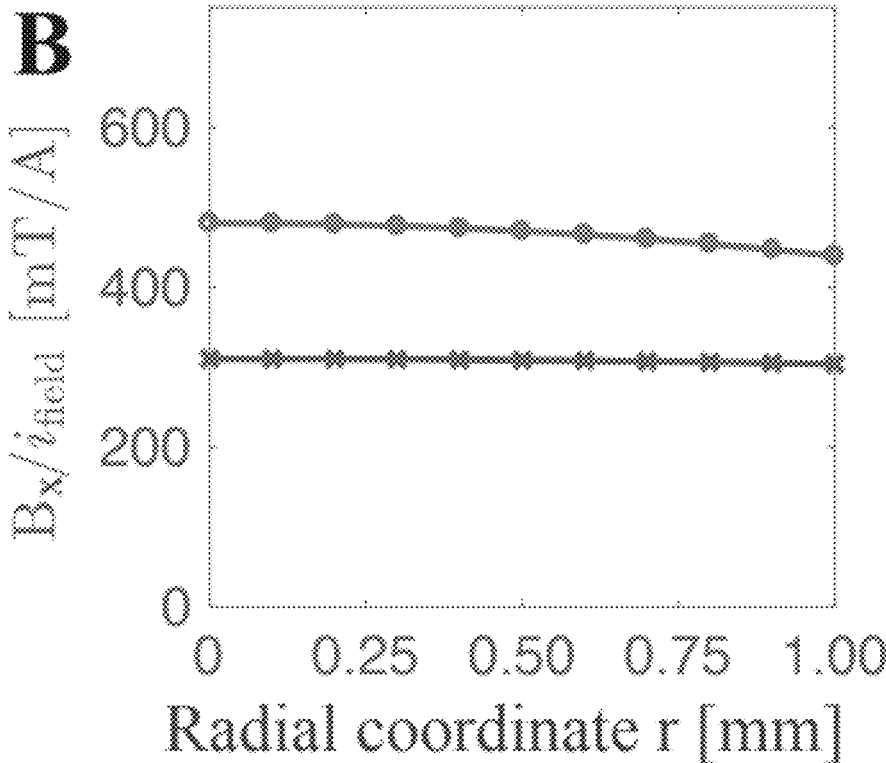

FIG. 1C shows, by way of example, calibrated FEM simulation on magnetic-field gradient $$\frac{\partial B}{\partial x}$$

dependence on axial coordinate, normalized by $i_{gradient}$. The micromanipulator 1 enables for cell-size-scale spatial resolution due to the gradient homogeneity or uniformity, while the micromanipulator 2 allows for stiff-sample measurements using further increased gradients, with a decreased gradient homogeneity or uniformity, thus intermediate spatial resolution. As shown in FIG. 1C, the magnetic field gradient of micromanipulator 2 is uniform when the axial coordinate x is below a threshold of approximately 0.7 mm. The micromanipulator 1 is the main instrument due to cell-size-scale spatial resolution. The $$\frac{\partial B}{\partial x}$$

dependence on radial coordinate is available in FIG. 2.

FIG. 1D shows, by way of example, micromanipulator 1 mounted on a microscope, which measures spatially varying viscoelasticity of samples with microenvironments i-ii.

Due to the symmetry, the field magnitude is independent of θ. A 3D-printed electromagnet/core stage and laser-cut sample holder were used for aligning all samples with the center of workspace, which is the microprobe-coordinate origin: p=[0 0 0]. Particularly, the forces F [N] applied by the spatially controlled B on each microprobe at the coordinate p are:

$$F = V_{mag} \nabla B \, M(B), \tag{1}$$

where $V_{mag}$ [m$^3$] is each microprobe's volume of magnetic material, $\nabla B$ is magnetic-field gradient, and M [A·m$^{-1}$] is microprobe magnetization, depending on B. To extract dynamic viscoelasticity within the workspace (see FIG. 1B), sinusoidal force exertion on probes is required. Sinusoidal force generation requires positive and negative field gradients superposed on a non-zero magnetic field. Without an offset of the magnetic field, the field direction may change when switching the gradient from positive to negative, thus, a microprobe may rotate (hard magnetic) or negate its magnetization direction (soft magnetic), both, leading to distorted dynamic viscoelasticity measurements. Specifically, axial field gradients $$\frac{\partial B}{\partial x},$$

offsetted by fields $B_x$, were used to exert forces F on microprobes. The experiments with the microprobes were carried out at the electromagnets' center axis (see FIG. 1C), where the radial r components of $\nabla B$ and B are negligible. Current-Based Control of $\nabla B$ and B to Exert Forces (F)

The gradients $$\frac{\partial B}{\partial x}$$

and fields $B_x$ scale linearly for the used electromagnet currents from −2.0 to 2.0 A. Thus, $$\frac{\partial B}{\partial x}$$

and $B_x$ were adjusted by corresponding currents, $i_{gradient}$ and $i_{field}$, respectively. The currents $i_{Electromagnet\ 1}$ and $i_{Electromagnet\ 2}$ fed to the electromagnets were:

$$i_{Electromagnet\ 1} = i_{gradient} + i_{field}, \tag{2}$$

$$i_{Electromagnet\ 2} = -i_{gradient} + i_{field} \tag{3}$$

For increasing forces F, we optimized the micromanipulators to get a maximal level of $$\frac{\partial B}{\partial x}$$

with a sufficient spatial homogeneity, using finite-element modeling (FEM; see FIG. 1B-C). The $$\frac{\partial B}{\partial x}$$

values of the modeling were originally calibrated against experiments in Pokki et. al. 2015, "Mobility-enhancing coatings for vitreoretinal surgical devices: hydrophilic and enzymatic coatings investigated by microrheology", ACS applied materials & interfaces 7.39, pp. 22018-22028, and here re-calibrated using hard-magnetic probe with known magnetization, density and dimensions, in viscous silicone oil, based on the force in Eq. 1 countering the force in Eq. 4 in an equilibrium. The calibrated FEM simulation enables to optimize the samples' on-axis workspace (WS) and the optimal core diameter $D_i$ in which $$\frac{\partial B}{\partial x}$$

is maximized and uniform. We identified WS=7.0 mm for the micromanipulator 1, and WS=3.5 mm for the micromanipulator 2, both constrained by core-to-core separation (ie. $D_1$=6.0 mm, and $D_2$=3.0 mm, respectively; see FIG. 1B). The micromanipulator 1 has an approximately constant $$\frac{\partial B}{\partial x}$$

within the used axial dimension (see FIG. 1C), thus, a cell-size-scale spatial resolution utilizing the microprobes is possible to acquire. The micromanipulator 2 has a further increased $$\frac{\partial B}{\partial x}$$

magnitude that allows for the measurements of stiff samples, although an intermediate position dependency of $$\frac{\partial B}{\partial x}$$

exists (see FIG. 1C). Current-normalized $$\frac{\partial B}{\partial x}$$

magnitudes are $$\frac{\partial B}{\partial x}/i_{gradient} = 34.6\frac{T}{m}/A$$

for the micromanipulator 1 and $$\frac{\partial B}{\partial x}/i_{gradient} = 84.6\frac{T}{m}/A$$

for the micromanipulator 2 (see FIG. 1C and FIG. 2). Current-normalized $B_x$ magnitudes are $B_x/i_{field}=311$ mT/A for the micromanipulator 1 and $B_x/i_{field}=481$ mT/A for the micromanipulator 2 (see FIG. 3).

Volumetric force $F_{V,probe}$

Micromanipulator-based viscoelasticity measurements require knowledge of the force F exerted on each microprobe. Since the cell-size-scale, 10-μm-diameter spherical microprobes have variations of diameter $D_{probe}$, we calculated volumetric force $F_{V,probe}$=F/V, where V is each microprobe's volume. The mean and standard deviation (SD) of microprobe diameter $D_{probe}$ is: mean±SD=10.70±0.31 μm (N=51). We altered the currents, $i_{field}$ and $i_{gradient}$, to vary $F_{V,probe}$ applied on microprobes. The currents are constrained by the electronics' supply of 2.0 A through each electromagnet:

$$i_{Electromagnet\ 1}=i_{gradient}+i_{field}=2.0\ A,\ \text{and}$$

$$i_{Electromagnet\ 2}=-i_{gradient}+i_{field} \qquad \text{(see Eqs. 2-3).}$$

Figure 4:
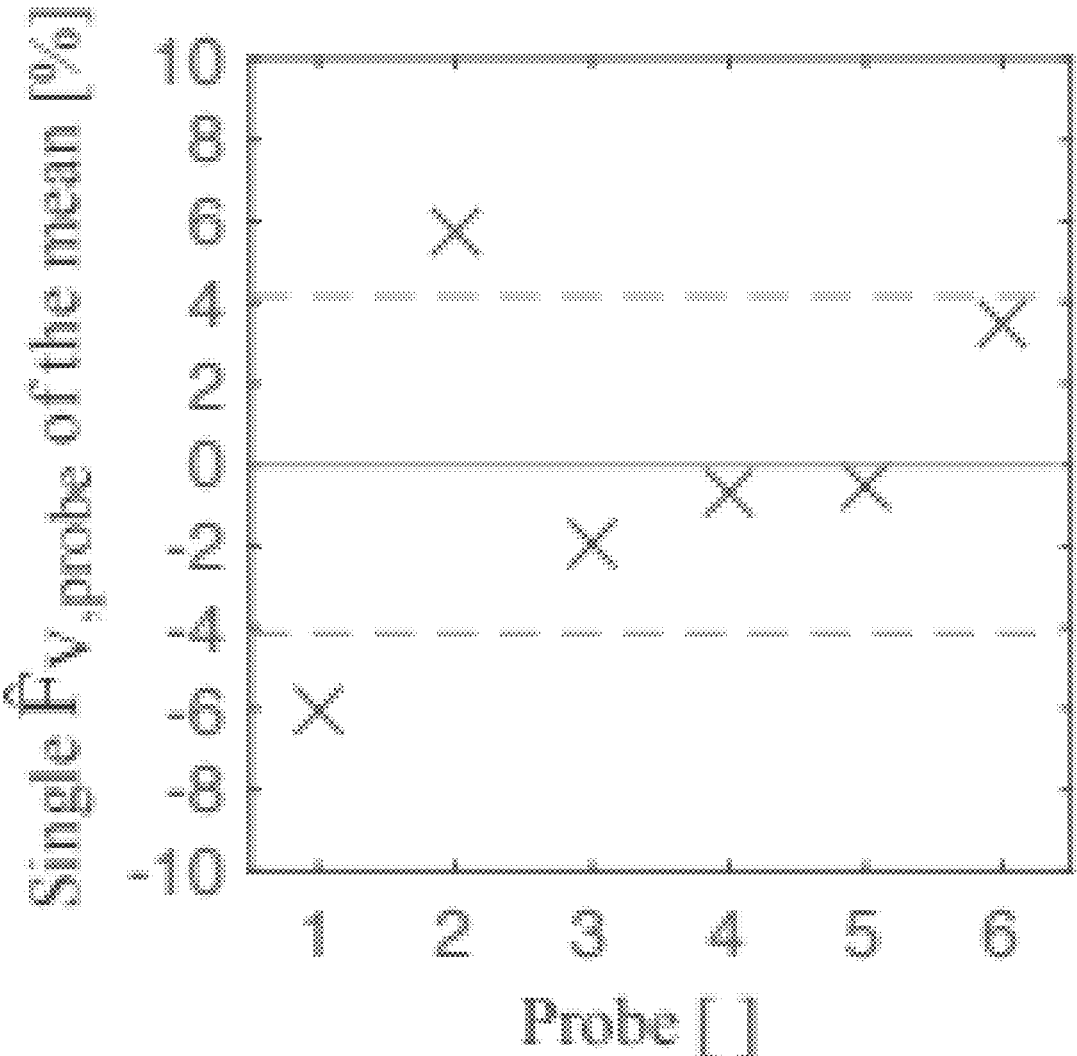
FIG. 4 shows, by way of example, accuracy of single probe measurement.

The maximum $F_{V,probe}$ magnitude ($\hat{F}_{V,probe}$) maximizes the signal-to-noise ratio of the detected microprobe displacements. For the purpose, we initially distributed the microprobes in a viscous fluid, silicone oil with a dynamic viscosity of η=0.998 Pa·s at 22° C. To find $\hat{F}_{V,probe}$, we measured Stokes' drag force $F_{Stokes}$ at low Reynolds' numbers:

$$F_{Stokes}=3\pi D_{probe}\cdot\eta\cdot v, \qquad (4)$$

where v is microprobe velocity. The Stokes drag force $F_{Stokes}$ counters the exerted force F (ie. |F|=|$F_{Stokes}$|). The measurements yielded the $\hat{F}_{V,probe}$ value for $i_{gradient}$=1.25 A, and $i_{field}$=0.75 A. The accuracy of $\hat{F}_{V,probe}$ measurements is illustrated by a SD of 4.1% (see FIG. 4). FIG. 4 shows, by way of example, accuracy of single probe measurement. Solid line with 0% denotes for the mean value, while dashed line marks the SD.

Next, oscillatory forces were exerted on microprobes by applying time (t) dependent field gradients using the current:

$$i_{gradient}=\hat{i}_{gradient}\cdot\sin(2\pi f\cdot t), \qquad (5)$$

where an amplitude of $\hat{i}_{gradient}$=1.25 A and a frequency of f=0.05 Hz were set. Meanwhile, a constant level of $i_{field}$=0.75 A was maintained for microprobe magnetization. Particularly, the amplitude of field gradient (ie. following $\hat{i}_{gradient}$) applied on the magnetized microprobes yields $\hat{F}_{V,probe}$. As a response to the oscillatory forces exerted on the microprobes, microprobe displacements $p_{probe}$ are:

$$p_{probe}=\hat{p}_{probe}\cdot\sin(2\pi f\cdot t-\delta), \qquad (6)$$

where $\hat{p}_{probe}$ [nm] is displacement amplitude, and δ [ ] is the phase shift between $p_{probe}$, and $i_{gradient}$ (ie. the latter is in phase with the exerted forces). The displacement amplitude $\hat{p}_{probe}$ and phase-shift δ responses in experiments using silicone oil are illustrated in FIG. 1E-F.

FIG. 1E shows, by way of example, amplitude and phase responses to a time-dependent oscillatory force-magnitude F, exerted on a microprobe, in silicone oil. The time shift $t_\delta$ corresponds to a phase shift of δ. The oscillatory F is carried out at a frequency of f=0.05 Hz. The thinner line is for the force and the thicker line is for the displacement.

FIG. 1F shows, by way of example, silicone oil used to calibrate for the forces F exerted on the microprobes.

Viscoelasticity values are reported as absolute shear modulus |G| [Pa] and loss tangent (φ) [ ], relying on the $\hat{p}_{probe}$ and δ responses, respectively:

$$|G| = \frac{F_{probe}}{3\pi D_{probe}\cdot\hat{p}_{probe}}, \qquad (7)$$

$$\phi = \tan(\delta), \qquad (8)$$

where $F_{probe}$ [N] is the amplitude of the exerted forces: $F_{probe}=\hat{F}_{V,probe}\cdot V$.

We calibrated the micromanipulators using collagen matrices (see FIG. 1G) with varied moduli |G|, measured with both micromanipulators and a macrorheometer, in order to ensure the precision for stiffness measurements. FIG. 1G shows by way of example, collagen matrix used to calibrate for the forces F exerted on the microprobes. This calibration provided the following $\hat{F}_{V,probe}$ values with uncertainty information in confidence intervals (CI): the micromanipulator 1 has $$\hat{F}_{V,probe} = 1.58\cdot10^5\frac{N}{m^3}$$

with a CI of ±3.5% (see FIG. 5A); and the micromanipulator 2 has $$\hat{F}_{V,probe} = 3.55\cdot10^5\frac{N}{m^3}$$

with a CI of ±4.1% (see FIG. 5B). A modulus |G| accuracy within ±4.1% is expected for a single experiment (see FIG. 4).

Figure 5:
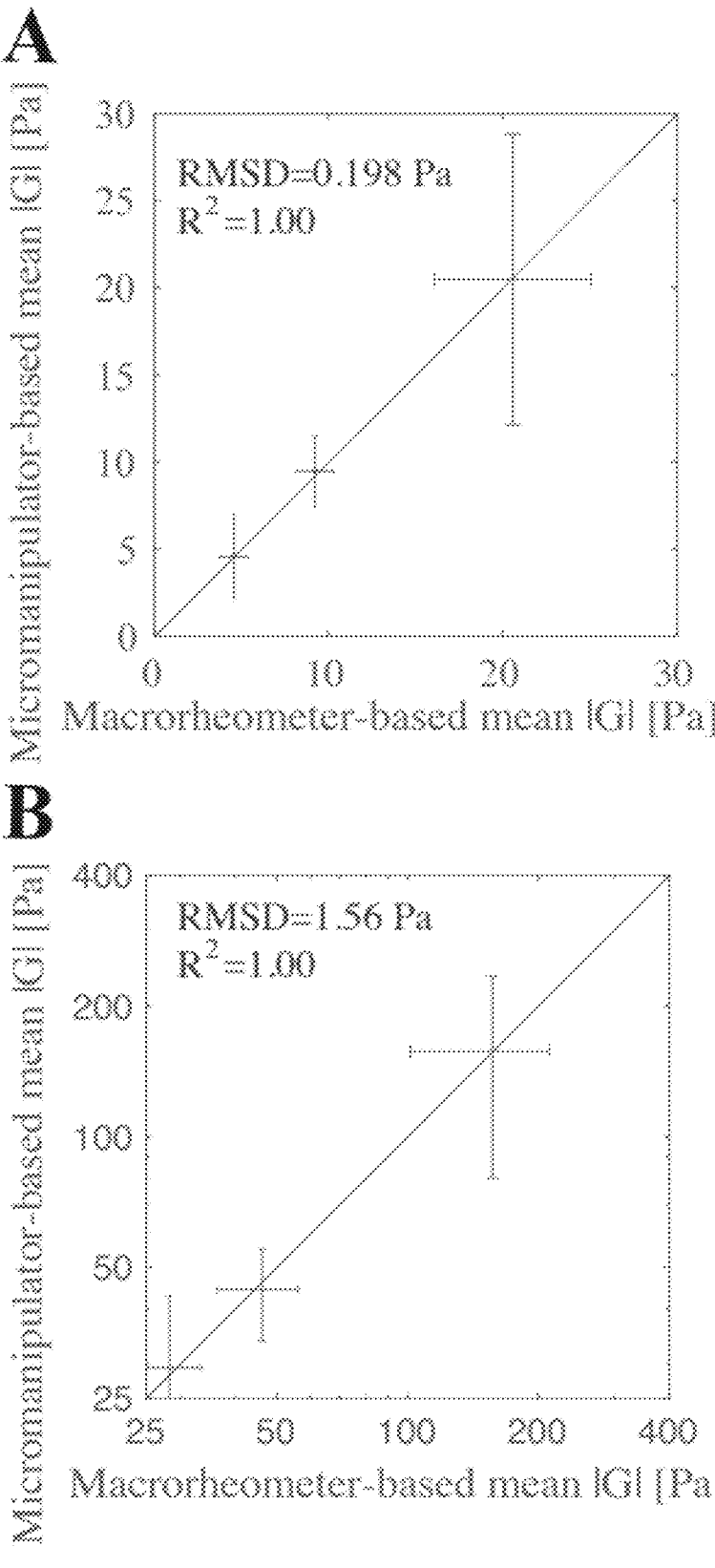
FIG. 5 shows, by way of example, micromanipulator calibration against macrorheometry.

FIG. 5 shows, by way of example, micromanipulator calibration against macrorheometry. Micromanipulator 1 (FIG. 5A) and 2 (FIG. 5B) compared against macrorheometer-based measurements, based on mean moduli |G|. Final volumetric force $\hat{F}_{V,probe}$ conversion is based on the slope of 1.00 for the relationship (plotted). The errorbars show the measurement SDs.

The accuracy of the loss tangent is based on the phase shift δ accuracy, or time t accuracy with a sinusoidal force application at a frequency of f=0.05 Hz. A typical uncertainty of loss tangent, for δ=0.38° and corresponding time value $t_\delta$=0.02 s, is ±0.007 (see FIG. 1E). The uncertainty for individual experiments relates to the frame acquisition speed of 20 fps with the force exertion at f=0.05 Hz, during which one frame's acquisition corresponds a loss tangent of 0.016 (ie. δ=0.9° or $t_\delta$=0.05 s).

Microscale Viscoelasticity of 3D Collagen Matrices

Figure 6:
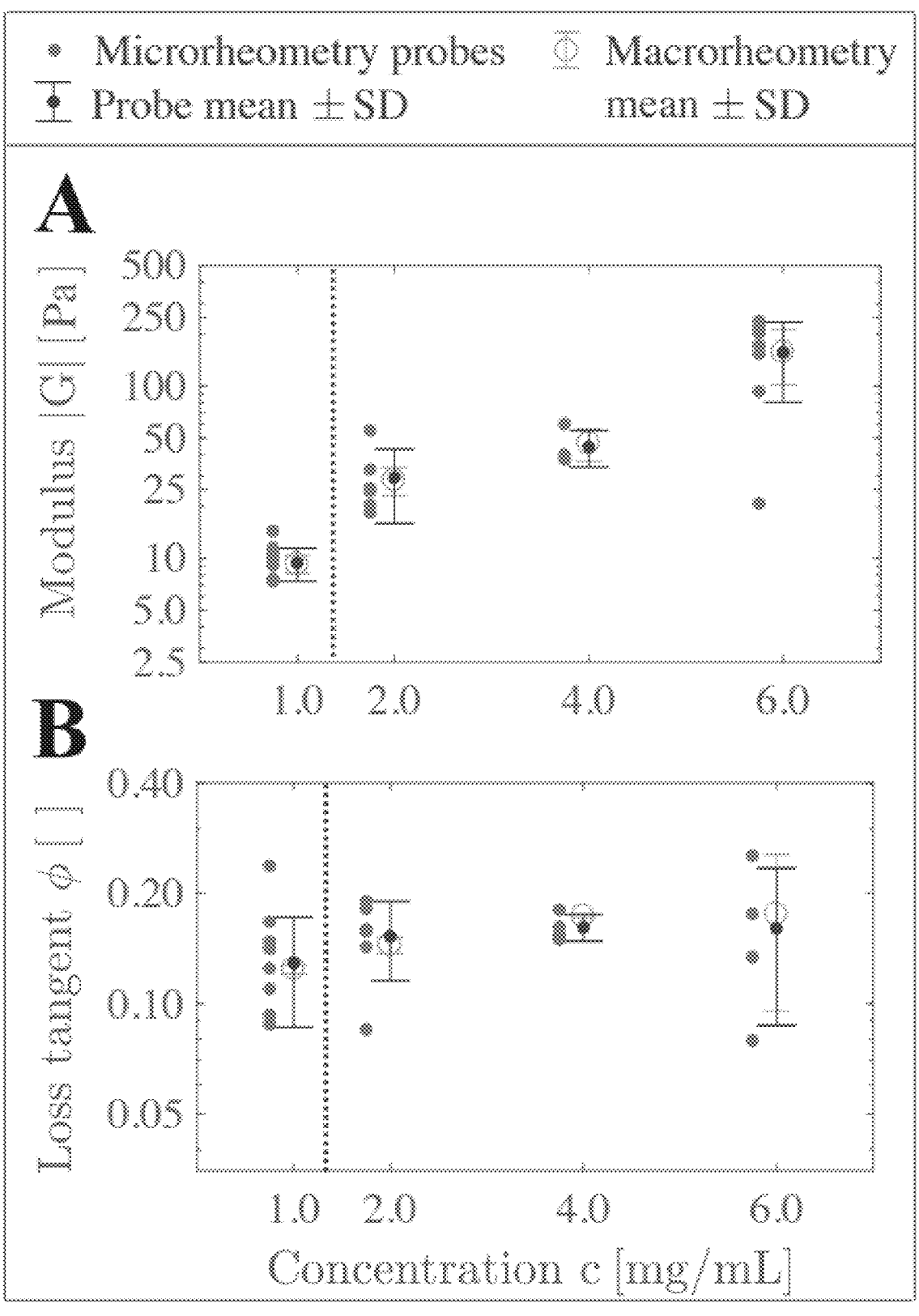
FIG. 6 shows, by way of example, microscale modulus and loss tangent.

Collagen matrices are viscoelastic and non-linear elastic (i.e. strain-dependent elastical responses). Probe-based micromanipulators measure microscale viscoelasticity, which was altered by adjusting collagen concentration (see FIG. 6). FIG. 6 shows, by way of example, how microscale modulus |G| (FIG. 6A) and loss tangent (FIG. 6B), obtained at 0.05 Hz using micromanipulator-based microrheometry, are compared with macrorheometry. The data for c=1.0 mg/mL is obtained using the micromanipulator 1 for cell-size-scale spatial resolution. The data for c=2.0-6.0 mg/mL, obtained using the micromanipulator 2, demonstrates the ability to measure stiff samples.

The mean values of the viscoelasticity-describing modulus |G| (FIG. 6A) and loss tangent (FIG. 6B) match between micromanipulator-based (localized) microrheometry and (bulk) macrorheometry. Whereas the calibration focuses on the mean moduli |G| of varied concentrations, the matching of the mean loss tangent values validates the instrument's accuracy for viscoelasticity measurements.

We probed localized modulus |G| values up to |G|=239 Pa while measuring localized loss tangent. The corresponding elasticity E level relates to shear modulus G=|G| with the following equation, assuming matrix isotropy:

$$E=G\cdot 2(1+\nu), \tag{9}$$

where ν is the matrix's Poisson ratio. The previously measured range for this type 1 collagen is ν=0.1-0.3. Thus, our maximum measured value |G|=239 Pa corresponds to E=525-621 Pa.

Figure 7:
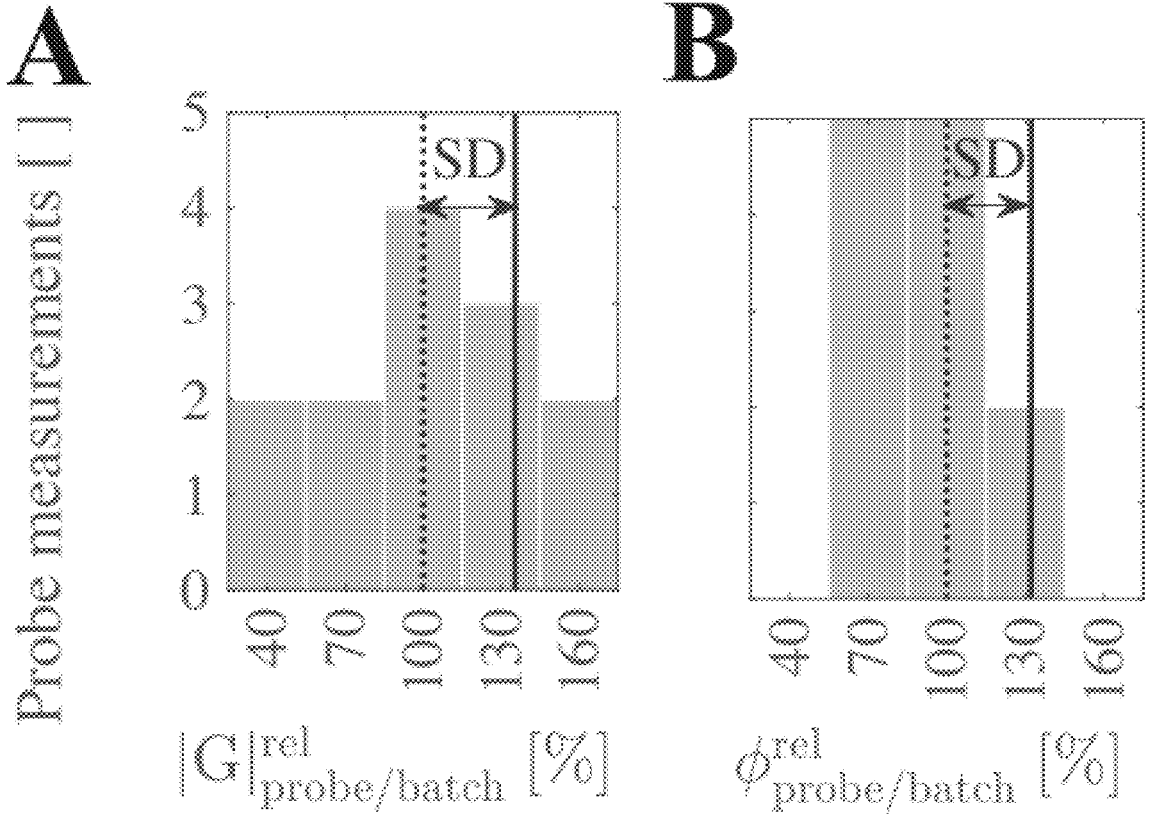
FIG. 7 shows, by way of example, spatial variance of the collagen matrix viscoelasticity.

While the mean values measured using microrheometry match up with macrorheometry, variation in the measured values may reflect real spatial heterogeneity in the material. The spatial variation of viscoelasticity was further quantified for the collagen concentration of c=1.0 mg/mL. Since viscoelasticity (modulus |G| and loss tangent ϕ) varies between collagen batches, the spatial variation was analyzed with respect to each collagen batch (ie. by normalizing with the mean of the batch values: $|G|_{batch}$, and $\phi_{batch}$). For the purpose, we quantified relative values:

$$|G|^{rel}_{probe/batch} = \frac{|G| - |G|_{batch}}{|G|_{batch}} \tag{10}$$

$$\phi^{rel}_{probe/batch} = \frac{\phi - \phi_{batch}}{\phi_{batch}}, \tag{11}$$

which illustrate the spatial variation independent of the used batch (see FIG. 7). Particularly, the SD is $$35\% \text{ for } |G|^{rel}_{probe/batch} \text{ and } 32\% \text{ for } \phi^{rel}_{probe/batch}$$

(number of probes N=13).

FIG. 7 shows, by way of example, spatial variance of the collagen matrix viscoelasticity. Spatially varying viscoelastic properties at the microscale measured for collagen matrices at a concentration of c=1.0 mg/mL: FIG. 7A: modulus-related $$|G|^{rel}_{probe/batch},$$

and FIG. 7B: loss tangent-related $$\phi^{rel}_{probe/batch}.$$

The SDs illustrate the spatially varying properties.

The capability of measuring cell-size-scale loss tangent has the potential to be critical in research on breast cancer, since related loss modulus is associated with progressed breast cancer of imaged patient tissue in vivo and breast-cancer cells in 3D cultures respond to alterations of the matrix's loss-tangent-related mechanical plasticity. This work paves the way for the use of systems that precisely quantify microscale viscoelasticity within 3D cell cultures for cancer-progression studies.

Materials and Methods

3D Collagen Matrices

The main experiments using 1.0-mg/mL-concentration collagen were based on a type 1 collagen with a batch concentration of ≅3.0 mg/mL (Corning cat. num. 354236). The calibration of the micromanipulator 1 for these main experiments also used a concentration of 2.0 mg/mL, diluted from this batch concentration. The calibration of the micromanipulator 2 required a higher batch concentration of 8-11 mg/mL that was used for dilutions of 2.0, 4.0, and 6.0 mg/mL (Fisher Scientific cat. num. CB354249).

The gelation of collagen is temperature and pH dependent. Thus, the collagen was kept on ice to retain a constant temperature while it was neutralized with 10× Dulbecco's modified eagle media (DMEM) using a volume ratio of 1:9 between the collagen and 10×DMEM. For validation, the pH of the neutralized collagen was controlled using a pH meter. In order to prepare a desired concentration, the neutralized collagen was diluted using 1×DMEM (Corning cat. num. 354236).

For all micromanipulator experiments, 100 μL of the diluting 1×DMEM was replaced with two aqueous solutions: 50 μL of 10-μm-diameter magnetic microprobes (Sigma-Aldrich cat. num. 49664; diluted to 0.3 wt %), and 50 μL of 6-μm-diameter non-magnetic reference microprobes (Polysciences cat. num. 15714; diluted to 0.3 wt %). Finally, the collagen dilutions were gelated within custom-made sample holders in an incubator for 40 min. The stability of the collagen mechanical properties was verified via macromechanical measurements using a rheometer.

Macromechanical Measurements Using a (Macro)Rheometer

Macromechanical measurements of collagen matrices were made using a AR2000ex rheometer (TA instruments). Immediately after diluting with 1×DMEM, the collagen was deposited with a syringe directly onto the bottom plate of the rheometer, and a 25 mm flat parallel plate was brought down. Thus, a 25 mm disk of collagen was formed. Mineral oil (Sigma) was applied onto the edges of the disk to prevent drying. Macroscale viscoelastic properties at a frequency of f=0.05 Hz and a strain of 1% were measured during the gelation of 40 min, until which |G| and φ reached an equilibrium.

Micromechanical Measurements Using Micromanipulators

Both micromanipulators consisted of two electromagnets with an outer diameter of 80 mm and length of 47 mm (Trafomic, Raisio, Finland). The micromanipulator 1 and 2 had an electromagnet inner diameter of 6.0 mm and 3.0 mm and corresponding 6.0-mm- and 3.0-mm-diameter cobalt-iron cores (Vacoflux 50, Vacuumschmelze, Hanau, Germany), respectively. The micromanipulator 1 and 2 were fixed on designated microscopes, Zeiss Axiovert 200M and Nikon Eclipse Ti2, respectively. The 3D collagen matrices were quantified in custom-made sample holders, fixed in the middle of the micromanipulator workspace (see FIG. 1D). The matrices were imaged using a 20× objective together with a Zeiss Axiocam 105 camera in Zeiss Axiovert 200M and an ORCA-Flash 4.0 LT+ camera in Nikon Eclipse Ti2.

Micromechanical measurements are carried out via the application of forces onto the microprobes in the 3D collagen matrices. Each of the two electromagnets (see FIG. 1A-B) was driven by a custom-made amplifier using a bipolar 40 V power supply (Keysight cat. num. U8032A). A custom-made Labview software was used for the generation and control of sinusoidal currents, via a DAQ card (National Instruments cat. num. NI PCIe6341) connected to the amplifiers. The software was adapted based on the one used in Buttinoni et al., 2017, "Colloidal polycrystalline monolayers under oscillatory shear, Physical Review E 95.1, p. 012610. Based on scripts input into the software, accurate currents were fed to both electromagnets at a frequency of 1000 Hz. Specifically, the desired sinusoidal current sequences were defined. After carrying out a current sequence (ie. exerting forces F on the microprobes), the timing and current data, together with microscope images were recorded in the PC.

Controlled sinusoidal forces F were applied on the microprobes within 3D collagen matrices at a frequency of f=0.05 Hz (see Eq. 5). The displacement response of the magnetic microprobes to the forces was tracked, using Matlab-based image-processing algorithms with background subtraction and binarization, from the images recorded at 20 fps (see Eq. 6). To remove any mounting-related displacement noise during experiments, tracked displacements of the non-magnetic reference microprobes were subtracted from the displacement response.

Each microscale viscoelasticity value (|G| and φ) is based on 2-5 repetitions using a probe, unless otherwise noted.

For example, magnetic bead-based probes with diameter of 10 μm may be used to measure complex mechanics, e.g. viscoelasticity, until E=0.5 kPa. Theoretically, the apparatus enables measurements with magnetic bead-based probes with diameter of 100 μm until E=50 kPa, wherein the magnetization is the same as with the 10 μm-diameter-probes. Experimental proof has been shown for measurements up to E=10 kPa. Probes with diameter of 10 μm, but with higher magnetization, may be used to measure even more than 10 times the current maximum stiffness 0.5 kPa.

Two electromagnets of maximum size, which fit inside a microscope, may be used in the microscope. Length of the electromagnet may be 47 mm, outer diameter may be 80 mm, and inner diameter may be the diameter of the core. For example, maximum resistance of the electromagnet may be R=20 Ohm. Thickness of the copper wire is dependent on the resistance and may be 0.71 mm.

Flat cobalt-iron cores in the electromagnets exert a magnetic field towards a 3D cell culture. Width of the cell culture may be at least 2.0-2.5 mm (micromanipulator 2) or at least 5.0-6.0 mm (micromanipulator 1). Relative permeability of the core is at least approximately 5000. Diameters of the cores may be optimized in order to maximize the magnetic field gradient causing the force into the 3D sample. Material of the cores may be cobalt-iron or other high-relative-permeability material, such as iron, ferrite based alloys, or products like Permalloy or Nanoperm.

For example, diameter of the core may be 2.8-3.2 mm. For example, diameter of the core may be D=3.0 mm (micromanipulator 2). For example, a distance between the cores may be 3.3-3.7 mm. Gradient may be maximized to the 3D cell culture with width of 2.0-2.5 mm, which is the minimum distance between the cores. Other dimensions (depth, height) of the cell culture are not so restricted by the geometry of the manipulator. For example, depth and height may be 5 mm or more than 5 mm. Gradients are predictable for separate areas of radius 1 mm.

As another example, diameter of the core may be 5.0-10.0 mm. For example, diameter of the core may be D=6.0 mm (micromanipulator 1). For example, a distance between the cores may be 7.0-14.0 mm. Field gradients are almost homogeneous and almost maximized. Gradients are predictable for areas of radius 1 mm. Width of the 3D cell culture may be 5.0-6.0 mm.

Cores may be tipless, or with flat ends, which means that diameter of the tip equals the diameter of the core. The tip has been whetted to achieve a flat end of the core. The flat ends enable achieving uniform field gradients at longer distances of the center of the cores. This enables also a larger workspace for the 3D cell cultures.

Microscope measures with sub-pixel resolution displacements of approximately 20 nm at smallest. If pixel size is p and magnification is s, then maximum of the p/s factor is 0.2 μm/pixel.

Permanent magnet probes may be moved in the 3D cell culture using low fields, such as smaller than 10 mT. Low fields do not affect the cells in the culture. Relatively low fields, such as approximately 100 mT, may be produced with soft magnet probes.

The apparatus as disclosed herein enables measurement of mechanical properties of the sample. Information on mechanical properties may be combined to imaged biological structures and biochemical functioning of the cells. The micromanipulator insert as disclosed herein may be integrated into a microscope. The manufacturing costs of the micromanipulator insert are low, as the insert is based on coils, cores and a holder which may be manufactured by 3D printing. Suitable electronics may be used to feed currents in a controlled manner, and a computer may be used to control the measurements. Softwares such as Labview and Matlab may be used. Manipulation of the probes within 3D cell cultures is contact-free which enables usage of the apparatus without obstructing the microscope utensils. The apparatus as disclosed herein enables controlling of the magnetic field level, in addition to the field gradients.

Measurement results achieved by the apparatus disclosed herein may be used in 1) diagnostics for personalized medicine based on altered tissue mechanics in persons' diseases, including cancer, 2) personalized drug screening (ie. Drugs effects on functional mechanics/structure, in diseases, such as in cancer), 3) tissue/cell therapies and gene therapies, 4) stem-cell research and manufacturing (quality control applied to batches of cells, as well as to cells in a cell bank; cell phenotype/identify monitoring, and determination of cell fate via application of targeted stress levels), 5) general fundamental cancer research, 6) fundamental cell biology (as a future standard add-on of microscopes).

The invention claimed is:

1. A microscope comprising a micromanipulator, the micromanipulator comprising:

a first electromagnet comprising a first magnetic core;

a second electromagnet comprising a second magnetic core, wherein the first magnetic core and the second magnetic core are configured to generate a magnetic force on magnetic probes arranged within a biological matrix arranged in between the first magnetic core and the second magnetic core; and wherein the microscope comprises or is connected to imaging means configured to capture images of the biological matrix comprising the magnetic probes for detection of displacements of the magnetic probes caused by the magnetic force, and wherein the microscope is configured to cause a magnetic field gradient causing the magnetic force to be uniform at least when a radial or axial distance from a centerline of the first electromagnet and the second electromagnet is below a threshold.

2. The microscope of claim 1, comprising:

a processing unit configured to: process the images to detect displacements of the magnetic probes caused by the magnetic force; and determine viscoelasticity of the biological matrix based on the detected displacements of the magnetic probes; or a transmitter configured to transmit the captured images of the magnetic probes to a processing unit for processing the images to detect displacements of the magnetic probes caused by the magnetic force and for determination of viscoelasticity of the biological matrix based on the detected displacements of the magnetic probes.

3. The microscope of claim 2, wherein the processing unit is configured to:

process the images to detect displacements of non-magnetic probes arranged within the biological matrix; and subtract the detected displacements of the non-magnetic probes from the detected displacements of the magnetic probes.

4. The microscope of claim 1, wherein the generated magnetic force is sinusoidal force.

5. The microscope of claim 1, wherein a diameter of the first magnetic core and the second magnetic core is 2.8-3.2 mm.

6. The microscope of claim 5, wherein a distance between the first magnetic core and the second magnetic core is 3.3-3.7 mm.

7. The microscope of claim 1, wherein a diameter of the first magnetic core and the second magnetic core is 5.0-10.0 mm.

8. The microscope of claim 7, wherein a distance between the first magnetic core and the second magnetic core is 7.0-14.0 mm.

9. The microscope of claim 1, wherein the magnetic probes are cell-size-scale.

10. The microscope of claim 1, wherein a diameter of the magnetic probes is 10 μm.

11. The microscope of claim 1, wherein a diameter of the magnetic probes is 100 μm.

12. The microscope of claim 1, wherein the magnetic probes are arranged within the biological matrix which is a 3D cell culture.

13. The microscope of claim 1, wherein a magnetic field strength of the magnetic field gradient causing the magnetic force is below 10 mT.

14. The microscope of claim 1, wherein a tip of the first magnetic core and a tip of the second magnetic core are flat.

15. The microscope of claim 1, wherein the first magnetic core and the second magnetic core are cobalt-iron cores or other high-relative-permeability material.

16. The microscope of claim 1, configured to measure a range of Young's moduli from 0.01 Pascal, Pa, to 10 000 Pa via tracking of microprobes having diameter in the range of 10 micrometres to 100 micrometres.

17. The microscope of claim 16, configured to measure displacements of the magnetic probes at a sub-pixel resolution.

* * * * *